(12) United States Patent
Ko

(10) Patent No.: US 12,486,166 B2
(45) Date of Patent: Dec. 2, 2025

(54) FUEL REFORMING APPARATUS FOR HIGHER EFFICIENCY REFORMING

(71) Applicants: HYUNDAI MOTOR COMPANY, Seoul (KR); KIA CORPORATION, Seoul (KR)

(72) Inventor: Dong Seok Ko, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 742 days.

(21) Appl. No.: 17/825,547

(22) Filed: May 26, 2022

(65) Prior Publication Data

US 2023/0219813 A1    Jul. 13, 2023

(30) Foreign Application Priority Data

Jan. 11, 2022   (KR) .................. 10-2022-0004222

(51) Int. Cl.
*C01B 3/38* (2006.01)

(52) U.S. Cl.
CPC .............. *C01B 3/382* (2013.01); *C01B 3/384* (2013.01); *C01B 2203/042* (2013.01); *C01B 2203/047* (2013.01); *C01B 2203/1258* (2013.01); *C01B 2203/142* (2013.01); *C01B 2203/1619* (2013.01)

(58) Field of Classification Search
CPC ............ C01B 2203/0244; C01B 3/382; C01B 2203/0233; C01B 2203/142; C01B 2203/0283; C01B 3/48; C01B 2203/0844; C01B 2203/82; C01B 2203/1241; C01B 2203/1235; C01B 2203/0883; C01B 2203/0811; C01B 2203/1258; C01B 3/384; C01B 2203/0816
See application file for complete search history.

(56) References Cited

U.S. PATENT DOCUMENTS

| | | | | |
|---|---|---|---|---|
| 5,840,437 | A * | 11/1998 | Diethelm | H01M 8/247 429/429 |
| 5,998,053 | A * | 12/1999 | Diethelm | H01M 8/247 429/429 |
| 6,299,994 | B1 * | 10/2001 | Towler | B01J 8/0469 423/652 |
| 6,969,562 | B2 | 11/2005 | Su et al. | |
| 2002/0142198 | A1 * | 10/2002 | Towler | H01M 8/0612 429/513 |

(Continued)

FOREIGN PATENT DOCUMENTS

| | | |
|---|---|---|
| EP | 3267524 B1 | 5/2020 |
| JP | 4033988 B2 * | 1/2008 ......... C07C 29/1518 |

(Continued)

*Primary Examiner* — Imran Akram
(74) *Attorney, Agent, or Firm* — MCDONNELL BOEHNEN HULBERT & BERGHOFF LLP

(57) ABSTRACT

A fuel reforming apparatus includes a pre-reformer that converts a fuel gas to methane by bringing the fuel gas into a reaction with water, a reformer that generates a mixture gas including hydrogen by bringing the fuel gas pre-reformed by the pre-reformer into a reaction with the water, a reformer burner that supplies heat to the reformer, and an exhaust gas supply line that causes an exhaust gas discharged from the reformer burner to be supplied to the pre-reformer as a heat source for the reaction of the pre-reformer.

6 Claims, 2 Drawing Sheets

(56) References Cited

U.S. PATENT DOCUMENTS

| | | | | |
|---|---|---|---|---|
| 2004/0194384 | A1* | 10/2004 | Nguyen | F23C 13/02 |
| | | | | 48/214 R |
| 2004/0209131 | A1* | 10/2004 | Bolton | C01B 3/384 |
| | | | | 423/652 |
| 2009/0155645 | A1* | 6/2009 | Cui | H01M 8/0618 |
| | | | | 429/495 |
| 2009/0230359 | A1* | 9/2009 | Guvelioglu | C01B 3/48 |
| | | | | 423/652 |
| 2011/0146991 | A1* | 6/2011 | Palamara | C01B 3/48 |
| | | | | 166/303 |
| 2012/0104321 | A1* | 5/2012 | Pham | C01B 3/384 |
| | | | | 252/373 |
| 2013/0126038 | A1* | 5/2013 | Jamal | H01M 8/0618 |
| | | | | 429/411 |
| 2014/0336420 | A1* | 11/2014 | Lijima | C10G 3/42 |
| | | | | 422/162 |
| 2016/0264415 | A1* | 9/2016 | Andersen | B01J 7/00 |
| 2016/0318824 | A1* | 11/2016 | Steynberg | C01B 13/0251 |
| 2018/0215617 | A1* | 8/2018 | Kang | C10L 3/103 |
| 2018/0215618 | A1* | 8/2018 | Kang | C01B 3/48 |
| 2018/0215619 | A1* | 8/2018 | Kang | C10L 3/103 |
| 2019/0263659 | A1* | 8/2019 | Shah | C01B 3/382 |
| 2020/0165128 | A1* | 5/2020 | Basin | B01J 8/062 |
| 2021/0155478 | A1* | 5/2021 | Shrivastava | B01D 53/047 |
| 2022/0089437 | A1* | 3/2022 | Shrivastava | C01B 3/384 |
| 2024/0018614 | A1* | 1/2024 | Kinzel | C21B 5/06 |

FOREIGN PATENT DOCUMENTS

| | | | |
|---|---|---|---|
| JP | 2009140695 A | * | 6/2009 |
| KR | 10-1845499 B1 | | 4/2018 |

* cited by examiner

FUEL REFORMING APPARATUS FOR HIGHER EFFICIENCY REFORMING

CROSS REFERENCE TO RELATED APPLICATIONS

This application claims the benefit of priority to Korean Patent Application No. 10-2022-0004222, filed in the Korean Intellectual Property Office on Jan. 11, 2022, the entire contents of which are incorporated herein by reference.

TECHNICAL FIELD

The present disclosure relates to a fuel reforming apparatus.

BACKGROUND

A fuel reforming apparatus is an apparatus that manufactures hydrogen through a reformer while taking a natural gas such as city gas as a fuel. FIG. 1 illustrates a conventional fuel reforming apparatus.

Referring to FIG. 1, a conventional fuel reforming apparatus 1 includes a fuel storage 20, a pre-reformer 30, and a reformer 40. The reformer 40 may generate a mixture gas including hydrogen by bringing a fuel gas supplied from the fuel storage 20 into a reaction with water supplied from a water supply source 10. Furthermore, the pre-reformer 30 is a device that is provided at a front end of the reformer 40 to generate methane by bringing the fuel gas into a reaction with vapor such that methane is used in the reformer 40.

Because the reactions in the reformer 40 and the pre-reformer 30 are endothermic reactions, heat has to be continuously supplied such that a high temperature is maintained. Accordingly, the conventional fuel reforming apparatus 1 separately includes a pre-reformer burner 35 that supplies heat to the pre-reformer 30, and a reformer burner 45 that supplies heat to the reformer 40. The pre-reformer burner 35 may receive the fuel gas from the fuel storage 20 through a first supply line 21, and the reformer burner 45 may receive the fuel gas from the fuel storage 20 through a second supply line 22. Reference numerals 36 and 46, which have not been described, are heat supply lines.

The pre-reformer 30 and the pre-reformer burner 35 are installed in the same reactor, and a scheme of applying heat to a pre-reformer tube installed at a center of or on a side surface of the reactor by using the pre-reformer burner 35 is used. Because the pre-reformer tube may directly contact flames generated in the pre-reformer burner 35, a heat-resistant alloy that is robust to a high heat is used.

In this way, because the conventional fuel reforming apparatus 1 uses the pre-reformer burner 35 separately from the reformer burner 45, an amount of the fuel supplied to the pre-reformer burner 35 is added and thus an efficiency of the reforming apparatus deteriorates. Furthermore, because a heat-resistant alloy of a high price is used as a material of the pre-reformer tube, cost may be increased.

SUMMARY

The present disclosure has been made to solve the above-mentioned problems occurring in the prior art while advantages achieved by the prior art are maintained intact.

An aspect of the present disclosure provides a fuel reforming apparatus that decrease a size of a pre-reformer by supplying heat to the pre-reformer by using an exhaust gas of a high temperature of a reformer burner and enhances an efficiency of an entire system.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a fuel reforming apparatus includes a pre-reformer that converts a fuel gas to methane by bringing the fuel gas into a reaction with water, a reformer that generates a mixture gas including hydrogen by bringing the fuel gas pre-reformed by the pre-reformer into a reaction with the water, a reformer burner that supplies heat to the reformer, and an exhaust gas supply line that causes an exhaust gas discharged from the reformer burner to be supplied to the pre-reformer as a heat source for the reaction of the pre-reformer.

The fuel reforming apparatus may further include storage that stores the fuel gas, a first fuel supply line that supplies the fuel gas from the storage to the pre-reformer, and a second fuel supply line that supplies the fuel gas from the storage to the reformer burner.

The fuel reforming apparatus may further include a control valve installed in the exhaust gas supply line and that controls a flow rate of the exhaust gas supplied from the reformer burner to the pre-reformer, and a controller that controls an operation of the control valve.

The fuel reforming apparatus may further include a temperature sensor that measures a temperature of the exhaust gas supply line, and the controller may control opening/closing of the control valve such that the flow rate of the exhaust gas supplied to the pre-reformer is controlled based on the temperature measured by the temperature sensor.

The fuel reforming apparatus may further include a first discharge line that discharges an exhaust gas generated by the pre-reformer, and a second discharge line branched from the exhaust gas supply line and connected to the first discharge line such that the exhaust gas generated by the reformer burner is exhausted.

The fuel reforming apparatus may further include a shift reactor that receives a first mixture gas that is the mixture gas generated by the reformer and generates a second mixture gas, from which carbon monoxide is removed by a water gas shift (WGS), and a gas purifier that purifies and separates the hydrogen from the second mixture gas generated by the shift reactor by using a pressure swing adsorption (PSA), and discharges an off gas, from which hydrogen is separated.

The fuel reforming apparatus may further include an off gas introduction line that supplies the off gas discharged from the gas purifier to the reformer burner.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described herein are embodiments that are suitable for understanding the technical features of a fuel reforming apparatus according to the present disclosure. However, the present disclosure is not limited to the embodiment described below or the technical features of the present disclosure are not limited by the described embodiments, and the present disclosure may be variously modified without departing from the technical scope of the present disclosure.

Figure 1:
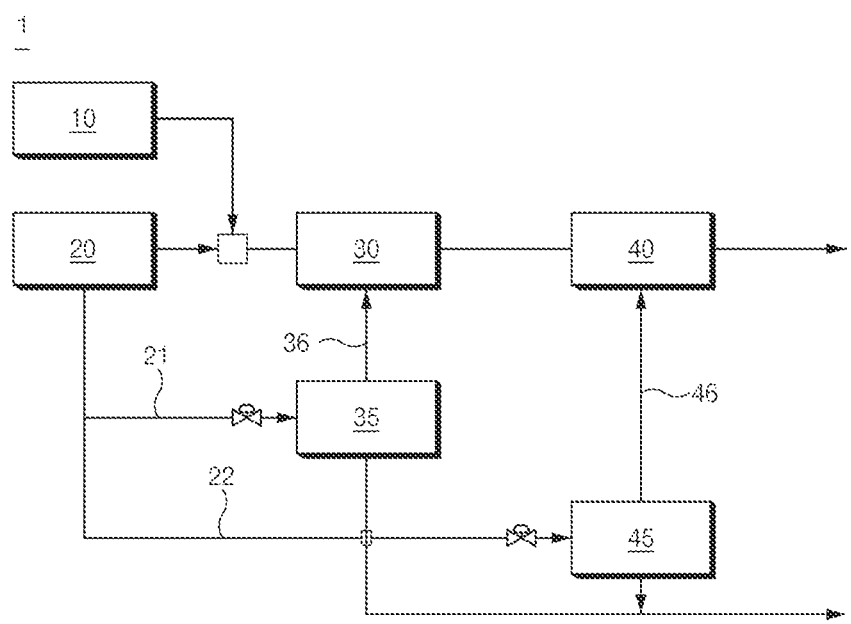
FIG. 1 is a diagram of a conventional fuel reforming apparatus.
Figure 2:
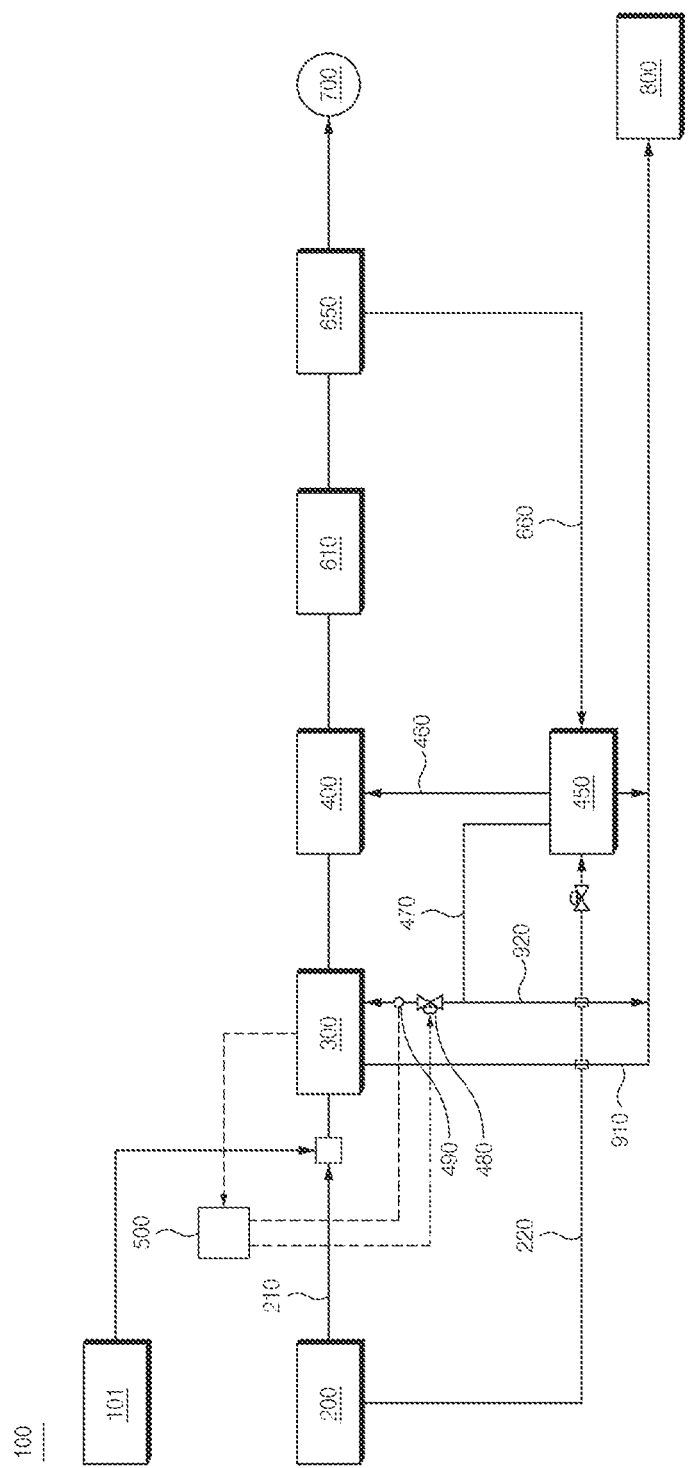
FIG. 2 is a diagram of a fuel reforming apparatus according to an embodiment of the present disclosure.

FIG. 1 is a diagram of a conventional fuel reforming apparatus. FIG. 2 is a diagram of a fuel reforming apparatus according to an embodiment of the present disclosure.

Referring to FIG. 2, a fuel reforming apparatus 100 according to an embodiment of the present disclosure includes a pre-reformer 300, a reformer 400, a reformer burner 450, and an exhaust gas supply line 470. Furthermore, the fuel reforming apparatus 100 according to the embodiment of the present disclosure may include storage 200, a first fuel supply line 210, and a second fuel supply line 220.

The storage 200 may be configured to store a fuel gas.

For example, the fuel gas stored in the storage 200 may be a liquefied petroleum gas (hereinafter, referred to as "LPG") including main substances of $C_3H_8$ and $C_4H_{10}$. As an example, the fuel reforming apparatus 100 may include a compressor (not illustrated) at a rear end of the storage 200, and may compress the fuel gas at a specific pressure (for example, about 8 bar) and introduce the compressed fuel gas into the pre-reformer 300.

The fuel gas stored in the storage 200 may be supplied to the pre-reformer 300 and the reformer burner 450. In detail, the present disclosure may include the first fuel supply line 210 that supplies the fuel gas from the storage 200 to the pre-reformer 300, and the second fuel supply line 220 that supplies the fuel gas from the storage 200 to the reformer burner 450.

The pre-reformer 300 is a device that converts the fuel gas to methane by bringing the fuel gas into a reaction with water.

In detail, the pre-reformer 300 is a device that increases a purity of methane by decomposing propane and butane in the fuel gas into methane ($CH_4$) such that the fuel gas may be used in the reformer 400. The pre-reformer 300 may receive the fuel gas from the storage 200 through the first fuel supply line 210. Because the reaction in an interior of the pre-reformer 300 is an endothermic reaction that generates methane by bringing the fuel gas into a reaction with a specific amount of vapor at a high temperature (300° C. to 600° C.), a device that supplies a heat source is necessary to maintain the high temperature. Furthermore, the fuel reforming apparatus 100 may include a water supply source 101 that is configured to supply ultrapure water to the pre-reformer and the reformer 400.

The reformer 400 may be configured to generate a mixture gas including hydrogen by bringing the fuel gas pre-reformed in the pre-reformer 300 into a reaction with water.

In detail, the reformer 400 is a device that generates hydrogen by bringing vapor and methanol into a reaction at a high temperature and at a high pressure. The fuel gas may be a mixture gas including hydrogen, carbon monoxide, and carbon dioxide. Because the reformer 400 performs an endothermic reaction that reforms methane into hydrogen by bringing methane into a reaction with oxygen in a high-temperature environment, it requires a device that continuously supplies heat.

The reformer burner 450 may be configured to supply heat to the reformer 400.

In detail, the reformer burner 450 may be connected to the reformer 400 through a heat supply line 460. The reformer burner 450 may generate combustion heat by mixing a burner fuel and air and burning the fuel, and may supply the combustion heat through the heat supply line 460 to maintain the reformer 400 at a high temperature that is necessary for a reforming reaction. The burner fuel of the reformer burner 450 may be the fuel gas that is received from the storage 200 through the second fuel supply line 220.

The exhaust gas supply line 470 may be configured to supply the exhaust gas discharged from the reformer burner 450 to the pre-reformer 300 as a heat source for the reaction of the pre-reformer 300.

In detail, the exhaust gas supply line 470 is a device that supplies the exhaust gas of the high temperature discharged from the reformer burner 450 to the pre-reformer 300 to supply a calorie that is necessary for the reaction of the pre-reformer 300. The exhaust gas supply line 470 may be provided separately from the heat supply line 460, and may be configured to cause the exhaust gas of the high temperature exhausted from the reformer burner 450 to flow.

In this way, the fuel reforming apparatus 100 according to the embodiment of the present disclosure may be configured to supply the exhaust gas of the high temperature discharged from the reformer burner 450 to the pre-reformer 300 to supply the calorie that is necessary for the reaction of the pre-reformer 300 such that a conventional pre-reformer dedicated burner may not be necessary, and thus may decrease a size of the pre-reformer 300.

Furthermore, according to the embodiment of the present disclosure, a total efficiency of the reforming apparatus may be increased as compared with a case of using the conventional pre-reformer dedicated burner. In detail, an amount of the fuel introduced into the burner is related to an efficiency of the fuel reforming apparatus 100, and according to the present disclosure, because a system that replaces the pre-reformer dedicated burner by using the exhaust gas of the high temperature of the reformer burner 450 may be constituted, a fuel that is consumed in the pre-reformer dedicated burner may be reduced, and thus a total efficiency of the reforming apparatus may be enhanced.

Meanwhile, the fuel reforming apparatus 100 according to the embodiment of the present disclosure may further include a control valve 480, a controller 500, and a temperature sensor 490.

The control valve 480 may be installed in the exhaust gas supply line 470, and may be configured to control a flow rate of the exhaust gas supplied from the reformer burner 450 to the pre-reformer 300. Furthermore, the controller 500 may be configured to control an operation of the control valve 480.

The temperature sensor 490 may be configured to measure a temperature of the exhaust gas supply line 470. Furthermore, the controller 500 may control opening/closing of the control valve 480 such that the flow rate of the exhaust gas supplied to the pre-reformer 300 is controlled based on the temperature measured by the temperature sensor 490.

For example, the temperature sensor 490 may be located on the exhaust gas supply line 470 on a downstream side of the control valve 480 with respect to a flow direction of the exhaust gas. Accordingly, the temperature sensor 490 may measure a temperature of the exhaust gas supplied to the pre-reformer 300. However, the location of the temperature sensor 490 is not limited thereto, and the location may be changed as long as the temperature of the interior of the exhaust gas supply line 470 may be measured.

The controller 500 may control the control valve 480 such that the control valve 480 is opened and closed, based on the temperature of the interior of the exhaust gas supply line 470, which has been measured by the temperature sensor 490. For example, when the temperature of the exhaust gas supply line 470 measured by the temperature sensor 490 is lower than a preset range, the controller 500 may open the control valve 480 or increase an opening degree of the control valve 480 to increase the amount of the exhaust gas of the high temperature supplied to the pre-reformer 300.

Meanwhile, the embodiment of the present disclosure may include a first discharge line 910 and a second discharge line 920.

The first discharge line 910 may be configured to discharge the exhaust gas generated by the pre-reformer 300, and the second discharge line 920 may be branched from the exhaust gas supply line 470 and be connected to the first discharge line 910 such that the exhaust gas generated by the reformer burner 450 is discharged.

In detail, the second discharge line 920 may be branched from the exhaust gas supply line 470 at an upstream point of the control valve 480 with respect to the flow direction of the exhaust gas. An exhaust gas 800 discharged through the first discharge line 910 and the second discharge line 920 may be discharged to an outside.

Meanwhile, the embodiment of the present disclosure may include a shift reactor 610 and a gas purifier 650.

The shift reactor 610 may be configured to receive a first mixture gas that is a mixture gas generated by the reformer 400 and generate a second mixture gas, from which mono dioxide is removed by a water gas shift (WGS).

In detail, the shift reactor 610 is a device that additionally produces hydrogen by bringing carbon monoxide contained in the first mixture gas generated by the reformer 400 into a reaction with hydrogen. The reaction in the shift reactor 610 may be an exothermic reaction that additionally generates hydrogen through the reaction under a catalyst of a low-temperature (200° C. to 400° C.). Through the water gas shift, carbon monoxide contained in the first mixture gas may be removed. The gas obtained by removing carbon monoxide from the first mixture gas by the shift reactor 610 is defined as a second mixture gas.

The gas purifier 650 may be configured to purify and separate hydrogen from the second mixture gas generated by the shift reactor 610 by using a pressure swing adsorption (PSA), and discharge an off gas, from which hydrogen is separated.

In detail, the gas purifier 650 is a device that separates only hydrogen in the second mixture gas, and the gases in the second mixture other than hydrogen is defined as an off gas. For example, the gas purifier 650 may include a plurality of adsorption towers filled with an adsorption agent, and may be configured to obtain hydrogen of a high concentration.

The embodiment of the present disclosure may further include an off gas introduction line 660 that supplies the off gas discharged from the gas purifier 650 to the reformer burner 450.

The off gas after the hydrogen is separated by the gas purifier 650 may be supplied to the reformer burner 450 through the off gas introduction line 660 to be utilized as a fuel. Accordingly, an efficiency of the reformer 400 may be enhanced.

For example, hydrogen 700 that passed through the gas purifier 650 may be supplied to a fuel cell stack, and the fuel cell stack may receive the hydrogen to generate electrical energy. However, the present disclosure is not limited thereto, and the hydrogen 700 that passed through the gas purifier 650 may be used in various devices that use the hydrogen as a fuel.

In this way, the fuel reforming apparatus according to the embodiment of the present disclosure may be configured to supply the exhaust gas of the high temperature discharged from the reformer burner to the pre-reformer to supply the calorie that is necessary for the reaction of the pre-reformer such that a conventional pre-reformer dedicated burner may be omitted, and thus may decrease a size of the pre-reformer.

Furthermore, according to the embodiment of the present disclosure, a total efficiency of the fuel reforming apparatus may be increased as compared with a case of separately using the conventional pre-reformer dedicated burner.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

The invention claimed is:

1. A fuel reforming apparatus comprising:
   a pre-reformer configured to convert a fuel gas to methane by bringing the fuel gas into a reaction with water;
   a reformer configured to generate a mixture gas including hydrogen by bringing the fuel gas pre-reformed by the pre-reformer into a reaction with the water;
   a reformer burner configured to supply heat to the reformer; and
   an exhaust gas supply line configured to cause an exhaust gas discharged from the reformer burner to be supplied to the pre-reformer as a heat source for the reaction of the pre-reformer;
   a first discharge line configured to discharge an exhaust gas generated by the pre-reformer; and
   a second discharge line branched from the exhaust gas supply line and connected to the first discharge line such that the exhaust gas generated by the reformer burner is exhausted.

2. The fuel reforming apparatus of claim 1, further comprising:
   storage configured to store the fuel gas;
   a first fuel supply line configured to supply the fuel gas from the storage to the pre-reformer; and
   a second fuel supply line configured to supply the fuel gas from the storage to the reformer burner.

3. The fuel reforming apparatus of claim 1, further comprising:
   a control valve positioned in the exhaust gas supply line and configured to control a flow rate of the exhaust gas discharged from the reformer burner to the pre-reformer; and
   a controller configured to control the control valve.

4. The fuel reforming apparatus of claim 3, further comprising:
   a temperature sensor configured to measure a temperature of the exhaust gas supply line,
   wherein the controller controls opening and closing of the control valve such that the flow rate of the exhaust gas discharged from the reformer burner to the pre-reformer is controlled based on the temperature measured by the temperature sensor.

5. The fuel reforming apparatus of claim 1, further comprising:
   a shift reactor configured to receive a first mixture gas that is a mixture gas generated by the reformer and generate a second mixture gas, from which carbon monoxide is removed by a water gas shift (WGS); and a gas purifier configured to purify and separate the hydrogen from the second mixture gas generated by the shift reactor by using a pressure swing adsorption (PSA), and discharge an off gas, from which the hydrogen is separated.

6. The fuel reforming apparatus of claim 5, further comprising:

an off gas introduction line configured to supply the off gas discharged from the gas purifier to the reformer burner.

* * * * *